No. 673,551. Patented May 7, 1901.
C. L. BALLARD & S. R. BLANCHARD.
COMBINATION OIL STOVE AND LAMP.
(Application filed May 16, 1900.)
(No Model.) 2 Sheets—Sheet 1.
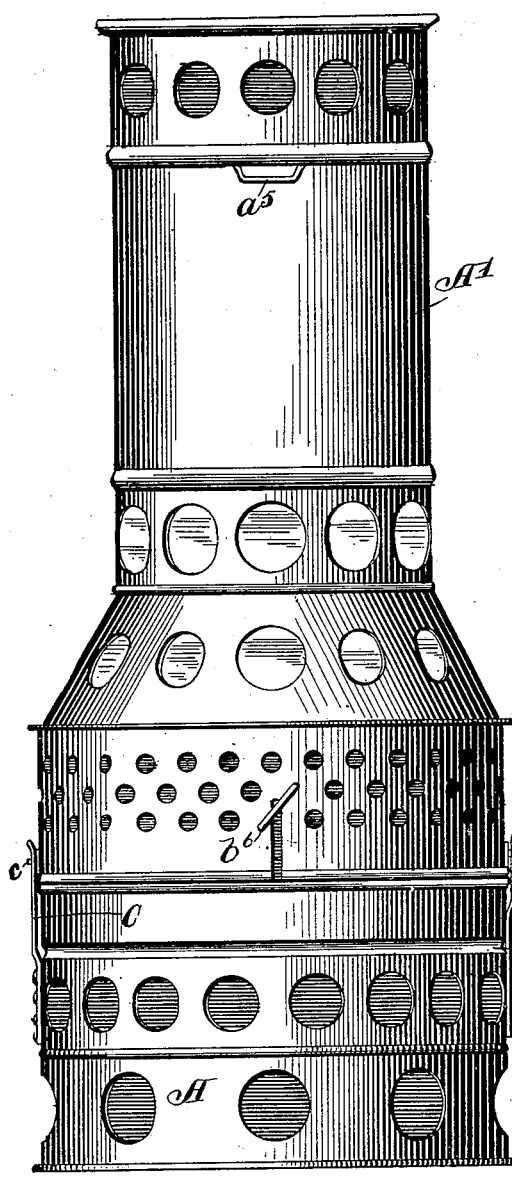
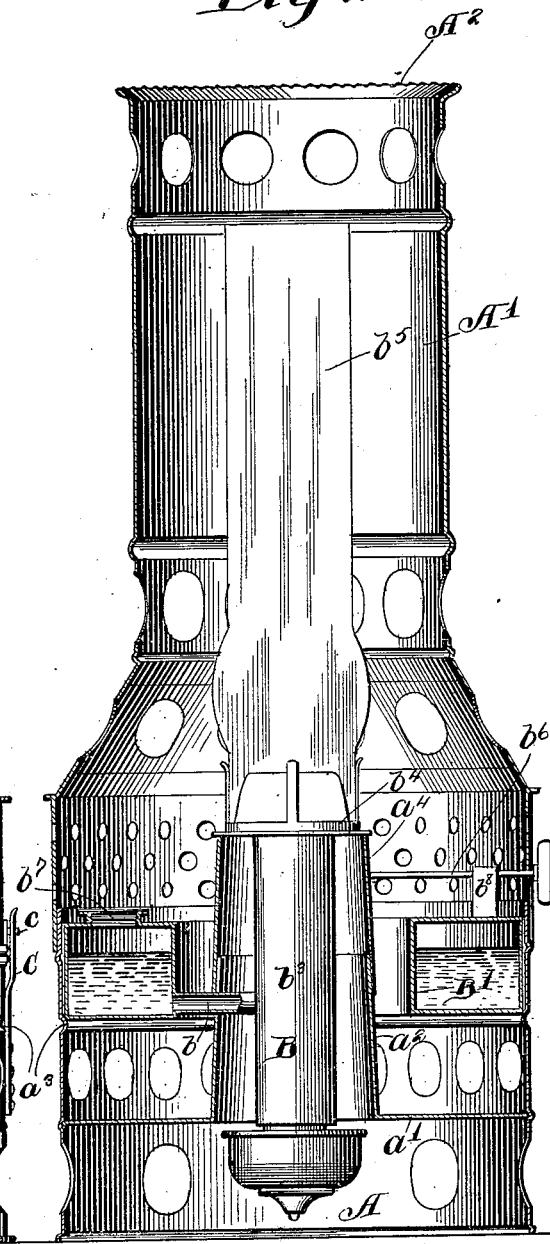
Witnesses:
Carl H. Crawford
C. N. Hills
Inventors
Casper L. Ballard
Sidney R. Blanchard
by Poole & Brown
Their Attorneys No. 673,551. Patented May 7, 1901.
C. L. BALLARD & S. R. BLANCHARD.
COMBINATION OIL STOVE AND LAMP.
(Application filed May 16, 1900.)
(No Model.) 2 Sheets—Sheet 2.
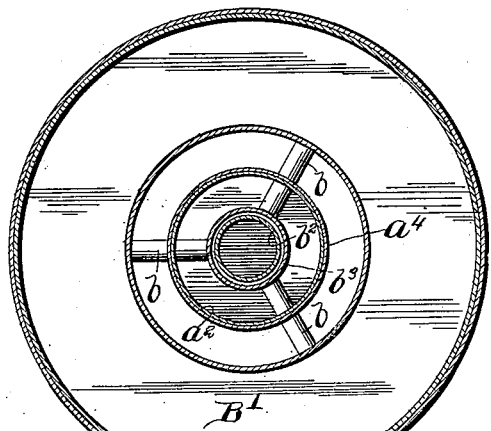
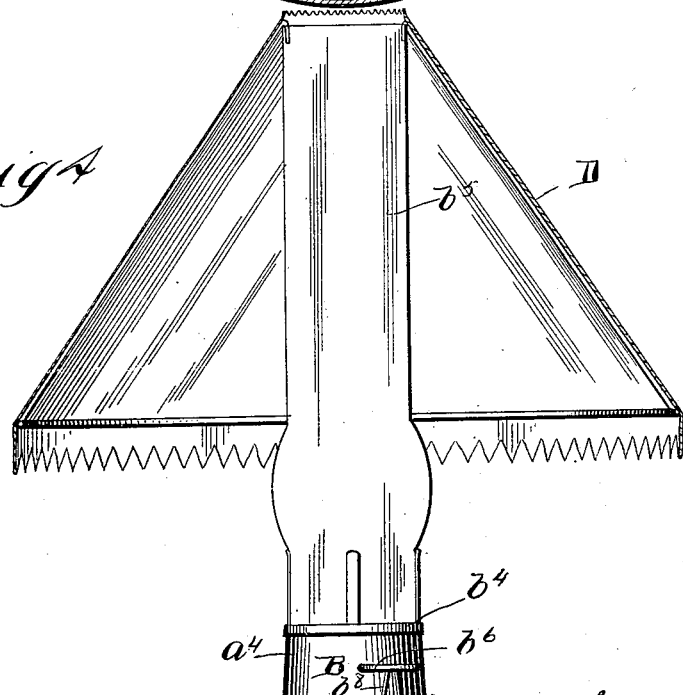
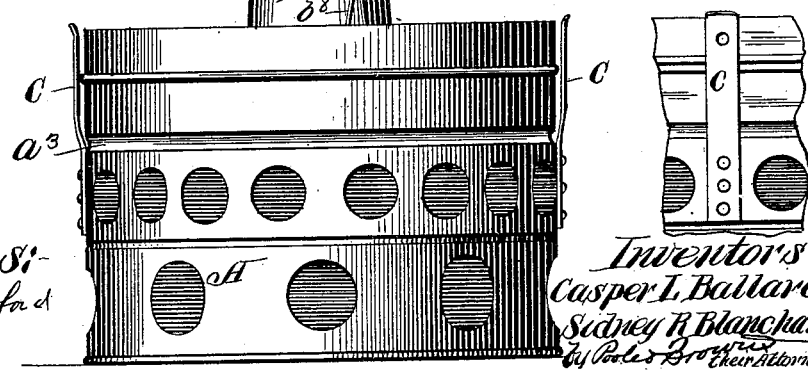

UNITED STATES PATENT OFFICE.

CASPER L. BALLARD AND SIDNEY R. BLANCHARD, OF OTTAWA, ILLINOIS.

COMBINATION OIL STOVE AND LAMP.

SPECIFICATION forming part of Letters Patent No. 673,551, dated May 7, 1901.

Application filed May 16, 1900. Serial No. 16,835. (No model.)

*To all whom it may concern:*

Be it known that we, CASPER L. BALLARD and SIDNEY R. BLANCHARD, of Ottawa, in the county of Lasalle and State of Illinois, have invented certain new and useful Improvements in a Combination Oil Stove and Lamp; and we do hereby declare that the following is a full, clear, and exact description thereof, reference being had to the accompanying drawings, and to the letters of reference marked thereon, which form a part of this specification.

This invention relates to an improvement in combined oil stoves and lamps of that class in which the same device may be used interchangeably for either purpose as desired.

The invention consists in the matters hereinafter described, and more fully pointed out and defined in the appended claims.

In the drawings, Figure 1 is a side elevation of a device embodying our invention. Fig. 2 is a vertical section of the same. Fig. 3 is a horizontal section taken through the oil receptacle and burner. Fig. 4 is a side elevation of a device embodying our invention, but used as a lamp. Fig. 5 is a detail illustrating a part of our invention.

As shown in the drawings, B indicates a lamp. A indicates a casing designed to receive said lamp and form the base of the device.

A' indicates an upper casing, preferably metallic, adapted to be secured to the lower casing A and to extend upwardly around the chimney and burner of the lamp and to provide a surface for radiating heat. As shown, the casing A is cylindrical and preferably constructed of sheet metal. $a'$ indicates a horizontal annular partition, its outer periphery secured in said casing, having a central aperture of sufficient size to receive the lower end of the lamp and provided on its inner edge with an upturned flange $a^2$, which forms a tubular air-space surrounding the wick-tube of the lamp and is provided with an upper tubular continuation $a^4$, fitting closely beneath the burner. The lower end of said casing is perforated for admission of air thereto, so that when the said lamp is ignited a current of air will be drawn inwardly beneath said partition $a'$ and upwardly through said air-space to supply the combustion at the wick. The oil-receptacle B' of the lamp is also annular and is removably secured in the top part of said casing A, fitting closely therein. The casing A between the bottom of said receptacle and partition $a'$ is provided with a plurality of apertures. The lower end of the upper casing A', which fits closely about the top of the lower casing A and is adapted to be rigidly locked thereto, is also provided with a plurality of apertures above the lamp-receptacle to admit inflowing of air above the same. Referring now more particularly to the features of construction, the lamp B may be of any desired construction and may be one or more in number. As herein shown, however, but one is indicated, and that is constructed upon the Argand principle—that is to say, it consists of inner and outer concentric tubes $b^2 b^3$, forming between the same an annular wick-space, thus providing for a supply of air on both sides of the wick in the combustion-chamber at the top of the wick. The oil-receptacle for said lamp B' is supported in the top third of the said casing A upon an inwardly-turned shoulder or crease $a^3$ in the casing A, which extends inwardly sufficiently far to support the body of the lamp. Said receptacle is annular, and the inner diameter of the same is approximately equal to half the diameter of the casing. The same is connected with the wick-tube by means, as herein shown, of three radial tubes $b$, herein shown to be spaced equal distances apart and constituting the ducts whereby oil is conveyed to the wick. Obviously it is not essential that all three of said tubes communicate with the interior of the receptacle or with the wick, inasmuch as a single duct will furnish a sufficient supply of oil for the lamp. Said receptacle is provided with a filling-aperture adapted to be closed by a screw-cap $b^7$ in a familiar manner. The said lamp is provided with the usual wick-actuating device $b^6$, the same having a relatively long shaft and being supported upon the lamp-receptacle by bearing $b^8$. As herein shown, the burner $b^4$ is of the usual form, and the same is provided with a chimney $b^5$ in any familiar manner. The partition $a'$ at the bottom of said casing is preferably of sheet metal and forms a tight joint at its periphery with the said casing. The flange $a^2$ extends upwardly from the inner circumference of the same to a point somewhat above the said tubes $b$, connecting the said receptacle with the wick-tube, and is slotted to receive the same, the metal at the lower end of said slot forming a support for the said tubes in the same plane with the inwardly-projecting shoulder or crease $a^3$ of the casing A. The tubular casing $a^4$ being at its lower end of slightly-greater diameter than the upper end of said flange $a^2$ fits over the same and is of sufficient length to extend upwardly from said tubes $b$ to beneath the burner of the lamp. Said casing $a^4$ is slotted to receive the shaft of the wick-actuating device $a^6$. The upper casing A′, as herein shown, is of a size at its lower end to fit over the lower end of the lower casing A and to provide a tight joint therewith. From a point approximately in the plane with the upper end of the wick the casing A′ is provided with a conical section, which reduces the diameter of the said casing about the flame of the lamp. Above the said conical section the shell is cylindrical and of sufficient size to permit an ample air-space between the same and the chimney. The said upper casing is provided with a plurality of apertures at its lower end, as before described, also with a plurality of apertures in the said central conical section and with a plurality of apertures at its upper end. Near the said upper end of the said casing and beneath the said apertures at said upper end is secured on either side of the same a bail or handle $a^5$, whereby the said device when used as a heater may be carried or whereby the said upper casing may be lifted from its engagement with the said lower casing. The upper end of said upper casing is provided with a transverse screen A², of wire-cloth, adapted to afford supporting means for any article it is desired to heat on said device when used as a stove. Locking means are provided to secure said upper casing A′ to said lower casing A when using the said device as a stove. Said locking device consists, as shown, of spring-clips C, rigidly secured to the lower casing by means of rivets or the like and extending upwardly beyond the line of contact of the said casings. The lower end of the upper casing is provided on opposite sides with outwardly-projecting studs $c$, adapted to be received in apertures in the upper ends of the said clips C. The upper ends of said clip are turned outwardly, so that when the said upper casing is placed in position or pushed downwardly the studs engage the curved upper ends of the clips, press the same back until the apertures are reached, and the said clips by their own resiliency spring inwardly to engage the studs.

When used as a heater, as illustrated in Figs. 1 and 2, it is preferable that the chimney $b^5$ be metallic, and the same may be constructed in any desired manner of sheet or rolled metal. Obviously from the construction described the said device when the upper casing is removed and the metallic chimney is replaced by the ordinary glass chimney of familiar form affords a lamp of great illuminating capacity. The device so used, provided with a familiar form of shade, is illustrated in Fig. 4.

The operation of our device as a stove is as follows: The oil at the wick being ignited, an upward current of air is formed in the chimney, which draws air in through the apertures at the base beneath the partition $a'$ and upwardly along the wick-tube and through the burner to the combustion-chamber, where the said air, with the products of combustion, passes outwardly at the top of the chimney. Above the partition $a'$ and between the flange $a^2$ and the receptacle is also formed an ascending current of air, inasmuch as the heat from the said burner causes the air within the upper casing to be expelled and produces an inflowing current through the apertures located between the bottom of the receptacle and the said partition $a'$. A sufficient air-space is allowed between the inner wall of said receptacle and the flange $a^2$ and tubular casing $a^4$ to insure that the fluid within said receptacle can by no means become affected by the heat of the burner. The cause that produces the inflowing currents of air beneath the receptacle produces similar inflowing currents of air above the receptacle. It will thus be seen that the receptacle is surrounded on all sides by an inflowing current of cold air, which, arising along the chimney, becomes heated and is thrown outwardly at the top of the casing or, if the same be partly covered by a dish or article which it is desired to heat, through the apertures beneath the top of said casing and above the upper ends of said chimney.

An important feature of our invention is the facility with which the same may be cleaned, it being obvious from the construction described that when the said upper casing is removed the entire lamp, with its oil-receptacle, may be lifted out of the lower casing, thereby making all parts of the device readily accessible for cleaning purposes or for repair. It is also obvious from the construction described that the device is exceedingly light, may be constructed at a relatively small cost, and will possess great heating and illuminating power.

Obviously it is not essential to our invention that the oil-receptacle be annular, inasmuch as the same may be of any desired conformation or may be disposed laterally with respect to the central tube.

We claim as our invention—

1. The combination with the lower casing A and the upper casing A′ which is provided with studs $c$, and has telescopic engagement at its lower end with the upper end of the lower casing, a central burner in said lower casing which projects into the lower end of the upper casing, an oil-receptacle fitted within the lower casing and resting on a shoulder $a^3$ therein, and separated from the burner by an annular space which surrounds the latter, one or more oil-ducts extending from said receptacle to the burner, a wick-shaft associated with said burner and passing outwardly therefrom, the upper casing being provided with a downwardly-opening slot which receives the outer end of said shaft, and latches C on the lower casing provided with apertures adapted to receive the studs $c$ on the upper casing.

2. The combination with an annular casing A provided with a partition $a'$ having an annular flange $a^2$, of a burner passing through said flange of less diameter than the flange, an oil-receptacle supported within the casing which surrounds said burner and is formed to provide an annular space between the receptacle and flange, radial tubes extending from said receptacle to the wick-tube of the burner, one or more of which is formed to convey oil from said receptacle to the wick-tube, said flange $a^2$ being provided at its top with downwardly-directed slots to receive said radial tubes, and an extension-tube $a^4$ fitted over the flange $a^2$ between said radial tubes and the upper end of the burner.

3. The combination with an upper and lower casing, of a horizontal flange $a'$ in said lower casing provided centrally thereof with an annular flange $a^2$, an extension-tube $a^4$ fitted over said flange, a burner supported within said flange and extension and of less diameter than the flange, an oil-receptacle supported in said casing and surrounding said flange and extension and formed to provide between the same and the flange and extension an annular air-space, and connections between said receptacle and wick-tube of the burner, said lower casing being provided both above and below the partition $a'$ with a series of air-inlet apertures, each communicating respectively with the space surrounding the burner and the space between the flange and extension and the oil-receptacle and the upper casing being provided above the oil-receptacle with air-inlet apertures.

4. In a lighting and heating apparatus, a lower casing provided with a shoulder, as $a^3$, an annular fluid-receptacle adapted to rest within the casing upon said shoulder and provided with an annular central opening therethrough, a wick-tube secured to said receptacle vertically arranged within said opening, a fluid-duct connecting the interior of the receptacle with the said wick-tube, a horizontally-arranged partition in said lower casing below the receptacle provided with a central opening, an upturned tubular partition surrounding said central opening and the said wick-tube, said upturned tubular partition being provided with a vertically-arranged recess or slot extending down from its upper edge for the reception of the oil-duct, openings in said casing below said horizontal partition for the admission of air to the wick-tube, openings above said partition for the admission of air surrounding the burner, the interior diameter of the fluid-receptacle being greater than the exterior diameter of the upturned tubular partition, which latter extends vertically above the lowermost points of said receptacle, substantially as shown and described.

In testimony that we claim the foregoing as our invention we affix our signatures, in presence of two witnesses, this 12th day of May, A. D. 1900.

CASPER L. BALLARD.
SIDNEY R. BLANCHARD.

Witnesses:
H. S. BLANCHARD,
M. B. MACKENZIE.